United States Patent
Kalker

(10) Patent No.: US 8,180,098 B2
(45) Date of Patent: May 15, 2012

(54) METHOD OF EXTRACTING A WATERMARK

(75) Inventor: Antonius Adrianus Cornelis Maria Kalker, Eindhoven (NL)

(73) Assignee: Civolution B.V., Eindhoven (NL)

( * ) Notice: Subject to any disclaimer, the term of this patent is extended or adjusted under 35 U.S.C. 154(b) by 841 days.

(21) Appl. No.: 10/514,903

(22) PCT Filed: Apr. 25, 2003

(86) PCT No.: PCT/IB03/01850
§ 371 (c)(1),
(2), (4) Date: Nov. 17, 2004

(87) PCT Pub. No.: WO03/098936
PCT Pub. Date: Nov. 27, 2003

(65) Prior Publication Data
US 2006/0117180 A1 Jun. 1, 2006

(30) Foreign Application Priority Data
May 22, 2002 (EP) .................................... 02077021

(51) Int. Cl.
*G06K 9/00* (2006.01)
(52) U.S. Cl. ........................................ 382/100; 713/176
(58) Field of Classification Search ................. 382/100; 713/176
See application file for complete search history.

(56) References Cited

U.S. PATENT DOCUMENTS

| | | | | |
|---|---|---|---|---|
| 6,430,301 B1 * | 8/2002 | Petrovic | ......................... | 382/100 |
| 6,647,128 B1 * | 11/2003 | Rhoads | ......................... | 382/100 |
| 6,771,794 B1 * | 8/2004 | Osaka | ......................... | 382/100 |
| 7,010,144 B1 * | 3/2006 | Davis et al. | ................... | 382/100 |
| 7,363,278 B2 * | 4/2008 | Schmelzer et al. | ............ | 705/67 |
| 7,519,819 B2 * | 4/2009 | Bradley et al. | ................ | 713/176 |
| 7,593,576 B2 * | 9/2009 | Meyer et al. | .................. | 382/190 |
| 2002/0126872 A1 * | 9/2002 | Brunk et al. | .................. | 382/100 |
| 2002/0168082 A1 * | 11/2002 | Razdan | ......................... | 382/100 |
| 2003/0026422 A1 * | 2/2003 | Gerheim et al. | ............. | 380/210 |
| 2003/0088774 A1 * | 5/2003 | Hars | ............................. | 713/176 |

FOREIGN PATENT DOCUMENTS

| | | |
|---|---|---|
| JP | 11-288217 | 10/1999 |
| JP | 2000-215238 | 8/2000 |
| WO | 02/37331 | 5/2002 |
| WO | WO02/065782 A1 | 8/2002 |
| WO | WO03/096337 A2 | 11/2003 |

OTHER PUBLICATIONS

Haitsma et al., "A Watermarking Scheme for Digital Cinema", 2001, IEEE, 487-489.*
Machine Translation of JP 11-288217.*

(Continued)

*Primary Examiner* — Jason M Repko
*Assistant Examiner* — Katrina Fujita
(74) *Attorney, Agent, or Firm* — Barnes & Thornburg LLP

(57) ABSTRACT

A monitoring station for monitoring distribution of media content, on basis of a watermark, comprises: receiving means for receiving an information signal representing the media content to which the watermark is added; extracting means for extracting perceptual features, identifying the information signal; first retrieving means for retrieving a supporting signal on basis of the perceptual features; second retrieving means for retrieving the watermark on basis of the supporting signal; and comparing means for comparing the watermark with predetermined information.

17 Claims, 1 Drawing Sheet

OTHER PUBLICATIONS

Figure 1:
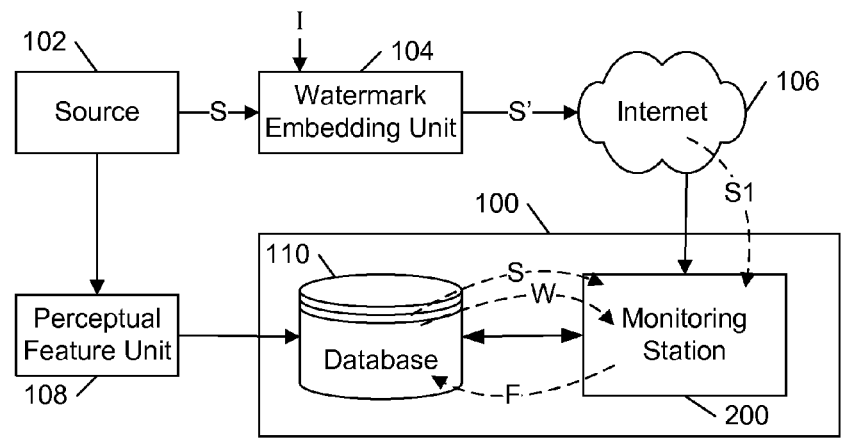

Machine Translation of JP 2000-215238.*
"Generating and Matching Hashes of Multimedia Content", European Patent Application 01200505.4, Filed: Feb. 12, 2001.
"Wathermark Embedding and Detection of a Motion Image Signal" European Patent Application 01202460.0, Filed: Jun. 21, 2001.
K. Ng et al, "Selective Block Assignment Approach for Robust Digital Image Watermarking" Proceedings of SPIE, vol. 3657, 1999, Abstract.
G. Langelaar et al, "Removing Spatial Spread SpectrumWatermarks by Non-Linear Filtering", Proceedings European Signal Processing Conference, Sep. 1998.
M. Kutter et al, "The Watermark Copy Attack", Proceedings of SPIE, vol. 3971, San Jose, CA, Jan. 2000.
J. Haitsma et al, "Robust Audio Hashing for content Identification", Proceedings of the Content-Based Multimedia Indexing, Brescia, Italy, Sep. 2001.

* cited by examiner

METHOD OF EXTRACTING A WATERMARK

The invention relates to a method of extracting a watermark which is embedded in an information signal, representing media content.

The invention further relates to a method of monitoring distribution of media content, the monitoring on basis of a watermark.

The invention further relates to a monitoring station for monitoring distribution of media content, the monitoring on basis of a watermark.

The invention further relates to a monitoring system for monitoring distribution of media content, the monitoring on basis of a watermark, comprising the monitoring station and a storage.

Watermarking is a technique for imperceptibly hiding auxiliary data in a multimedia signal, such as still images, audio and video. For a number of applications the security of a watermarking system is of prime importance. Examples are copy protection for DVD-Video and copy protection for music on portable devices. The ease (or difficulty) by which an unauthorized user is able to read, write or modify the watermark channel defines the security of a watermarking method. In order to prevent or at least limit the possibility for security breaches, the watermark, carrying some information, is preferably embedded with a very low signal-to-noise-ratio (SNR). This helps in reducing the risk of watermark estimation attacks. See the article "Removing Spatial Spread-Spectrum Watermarks by non-linear Filtering", by G. Langelaar et al., in Proceedings of European Signal Processing Conference (EUSIPCO-98), Rhodes, September 1998.

Besides that, many watermarking methods employ secret pseudo-random sequences, usually dependent on some secret key as an input parameter for a pseudo-random noise generator. Without knowledge of the secret key it is difficult to establish the presence of a watermark channel. It is recognized in the watermarking community that a watermarking method can be made more secure by having this secret noise sequence not fixed, but dependent on the content that is being watermarked. This increases the difficulty of applying a successful hack of the watermark of one particular media object to other media objects, e.g. a song to other songs. See for instance the article "Watermark Copy Attack", by M. Kutter et al. in SPIE Proceedings 3971 on Security and Watermarking of Multimedia Content II, San Jose, January 2000.

However, the disadvantage of this latter approach is the increased difficulty and complexity to detect watermarks and reliably read the information carried with the watermark.

It is an object of the invention to provide a method of extracting a watermark, from a watermark channel, in a relatively easy way.

This object of the invention is achieved in that the method comprises:
  extracting perceptual features, identifying the media content;
  retrieving a supporting signal on basis of the perceptual features; and
  retrieving the watermark on basis of the supporting signal.
With retrieving is meant detecting the watermark and/or reading embedded information. With media content is meant audio and/or visual information as songs, tunes, movies, films, pictures, etcetera. Watermark detection performance can be improved by changing from "blind" detection, i.e. without using the original signal on which the information signal is based, to informed detection, i.e. by using a supporting signal. Having the supporting signal at hand, increases performance by allowing a better estimate of the watermark and by permitting a better SNR for watermark detection. The difficult part of this approach lies in obtaining an appropriate supporting signal. If this were to be done manually (locating an appropriate original unmarked signal and retrieving supporting signal(s)), this mode of operation would be economically unattractive. However, using essential perceptual features technology in combination with a mapping from perceptual features to supporting signals, this process can be automated. Preferably a database of features, coded as or represented by fingerprints, is used to implement the mapping from perceptual features (fingerprints) to supporting signals. A fingerprint, often also referred to as signature or hash, is a concise digest of the most relevant perceptual features of a signal. Unlike cryptographic hashes that are extremely fragile (flipping a single bit of the source data will in general result in a completely different hash), fingerprints are herein understood to be robust. That is, if source signals are perceptually similar, then the corresponding fingerprints are also very similar. Fingerprints are therefore used to identify audiovisual contents. An example of a method of generating a fingerprint for a multimedia object is described in European patent application number 01200505.4, as well as in "Robust Audio Hashing For Content Identification", by Jaap Haitsma, Ton Kalker and Job Oostveen, in International Workshop on Content-Based Multimedia Indexing, Brescia, September 2001.

In an embodiment of the method of extracting a watermark according to the invention, the supporting signal comprises a part of an original signal on which the information signal is based. The advantage of this embodiment is that it enables a robust watermark channel. By using the original signal on which the information signal is based the detection of the watermark is relatively easy. Typically a subtraction of a resynchronized version of the original signal from the information signal is performed to find an estimate of the embedded watermark.

In another embodiment of the method of extracting a watermark according to the invention, the supporting signal is derived from the original signal on which the information signal is based. For example the average luminance values of the pixels per frame of a video sequence, in the case that the information signal represents a video sequence as described in European patent application number 01202460.0. The advantage of this embodiment is data reduction, because a relatively little amount of data is required to store and transmit average luminance values. Hence, the amount of data to be returned as a result of a query on the basis of the perceptual features, is limited.

In another embodiment of the method of extracting a watermark according to the invention, the supporting signal comprises watermark parameters which are appropriate for the information signal. With watermark parameters is meant e.g. pseudo-random sequences and secret keys. As described above, such content based watermarking results in a more secure watermark channel.

In another embodiment of the method of extracting a watermark according to the invention, the watermark is representative for an originator of an original signal on which the information signal is based. In this way it is possible to discover the originator of the original signal. This is especially of interest in the case of monitoring distribution of media content. Other type of information for that purpose is e.g. the purchaser or owner of a copy of the original signal.

It is a further object of the invention to provide a method of monitoring distribution of media content, of the kind described in the opening paragraph wherein the watermark is extracted from a watermark channel, in a relatively easy way.

This object of the invention is achieved in that the method of monitoring comprises:

receiving an information signal representing the media content to which the watermark is added;

extracting perceptual features, identifying the media content;

retrieving a supporting signal on basis of the perceptual features;

retrieving the watermark on basis of the supporting signal; and applying information, being exchanged by means of the watermark, for the monitoring.

Applying might be comparing the watermark with predetermined information. Typically the predetermined information is related to a copyright or to the originator of the original signal. Alternatively it means counting the reception of information items which have a predetermined type. But other types of usage are possible too. Robust fingerprint technology allows identifying the original signal, whereupon supporting signals and information is used to improve the robustness and/or security of watermark detection.

It is a further object of the invention to provide a monitoring station of the kind described in the opening paragraph, being arranged to extract the watermark from a watermark channel, in a relatively easy way.

This object of the invention is achieved in that the monitoring station comprises:

receiving means for receiving an information signal representing the media content to which the watermark is added;

extracting means for extracting perceptual features, identifying the information signal;

first retrieving means for retrieving a supporting signal on basis of the perceptual features;

second retrieving means for retrieving the watermark on basis of the supporting signal; and means being arranged to apply information being exchanged by means of the watermark.

It is a further object of the invention to provide a monitoring system of the kind described in the opening paragraph being arranged to extract the watermark from a watermark channel, in a relatively easy way.

This object of the invention is achieved in that the monitoring system comprises:

the monitoring station as claimed in claim 7; and a storage comprising a mapping of the perceptual features to the supporting signal.

Modifications of the method of extracting a watermark and variations thereof may correspond to modifications and variations thereof of the method of, the station for and system for monitoring distribution of media content, described.

Figure 2:
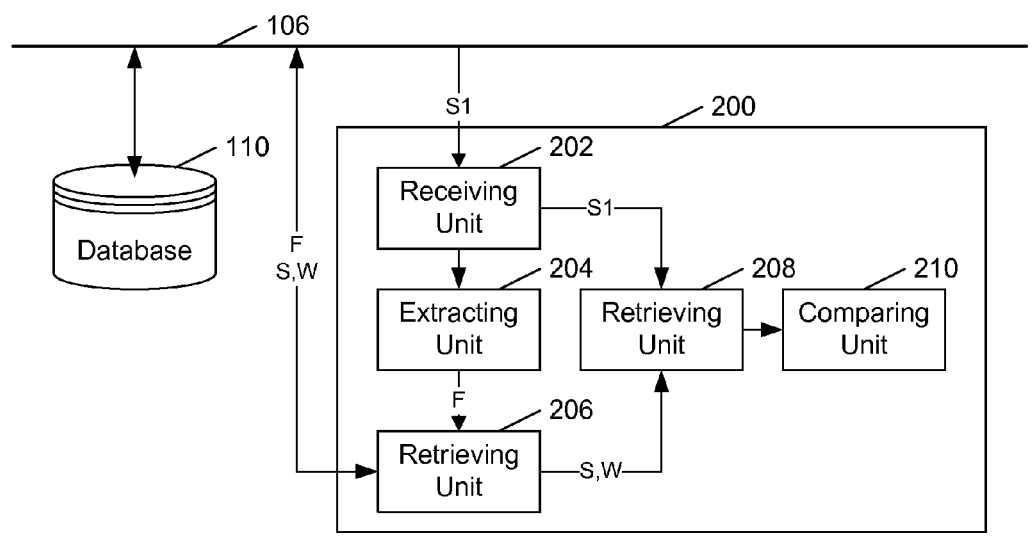

These and other aspects of the method of extracting a watermark and of the method of, the station for and system for monitoring distribution of media content according to the invention will become apparent from and will be elucidated with respect to the implementations and embodiments described hereinafter and with reference to the accompanying drawings, wherein:

FIG. 1 schematically shows a context diagram comprising the system for monitoring distribution of media content according to the invention; and FIG. 2 schematically shows an embodiment of the system for monitoring distribution of media content according to the invention.

Corresponding reference numerals have same or like meaning in all of the Figs.

FIG. 1 schematically shows a context diagram comprising the system 100 for monitoring distribution of media content according to the invention. To illustrate the usage of the system 100 for monitoring distribution of media content an example of electronic music distribution (EMD) is provided. Selling and controlling of music in an EMD context often involves the following steps:

Person P directs his Internet browser to the Web-site of the EMD company E and requests for a song S;

Company E checks the financial credentials of P, and if found to be in order, retrieves the song S from a audio source database 102, and adds watermarking information I to the song S by means of the watermark embedding unit 104 to obtain song S'. This information I typically carries the name of company E, identifying E as the rightful copyright owner, as well as personalized information, identifying P as the buyer of the song. Besides embedding a watermark, company E also derives a perceptual feature F from the song by means of perceptual feature unit 108. These perceptual features are stored in a database 110 together with one or more supporting signals which can (and will) eventually be used by company E to detect the watermark in order to retrieve the information to check legitimate usage of the song S'.

Company E provides P with the possibility to download song S' from its Web-site, while informing P that he may only copy or distribute this song for private use.

In order to enforce this private-use rule, company E operates a web spider service, i.e. system for monitoring distribution of media content. The web spider service continuously scans the Internet 106 for copies of S that violate the private-use rule. Typically, if multiple copies of a song S' are found on a file-sharing network, each copy identifying E as the copyright owner and P as the original buyer, person P will be informed that he/she is in violation, and appropriate action will be undertaken.

The system 100 for monitoring distribution of media content may comprise a number of stations 200 for monitoring distribution of media content and a storage. In FIG. 2 only one station 200 is depicted. FIG. 2 shows a central database 110. However a distributed database might be possible too. The station 200 for monitoring distribution of media content comprises:

A receiving unit 202 for receiving an information signal representing the media content to which the watermark is added;

A extracting unit 204 for extracting perceptual features, identifying the information signal;

A first retrieving unit 206 for retrieving a supporting signal on basis of the perceptual features;

A second retrieving unit 208 for retrieving the watermark on basis of the supporting signal; and A comparing unit 210 for comparing the watermark with predetermined information.

It is assumed that the station 200 for monitoring distribution of media content is used as a web spider as described above. Then the working of the station 200 is as follows:

The station 200, in operation for company E, receives a suspect song S1 by means of receiving unit 202;

Essential perceptual features F are derived from S1 by means of the extracting unit 204;

The features F are used as a query to the database 110, retrieving the original copy S; Optionally a corresponding watermark W and or other information is retrieved;

The copies S and S1 are resynchronized by means of the second retrieving unit 208. Subsequently an appropriate difference signal is computed as an estimate W' of the embedded watermark W;

The embedded information I, if present, is retrieved from W' by applying watermark detection with the watermark W. The comparing unit 210 compares the information I with predetermined information, e.g. from a list of suspected persons or songs. In the case of a match a violation of the private-use rule is proven.

In FIG. 2 a database 110 and a station 200 are depicted which are both connected to a network 106. It is assumed that via this network 106 sites are accessible, on which copies S1 of the song S reside. In FIG. 2 is depicted that, except the storage of perceptual features F and supporting signals, the processing units 202-210 are deployed in the station 100. It should be noted that alternative deployments of processing steps are possible. E.g. the database 110 and the station 200 might be combined or some of the extracting and or retrieving unit might be deployed in a sub-system, which comprises the database 110. The processing units 202-210 of the station 200 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

What has been presented above is a system for monitoring distribution of media content based on informed watermark detection in a connected environment. In a non-connected environment a similar monitoring is also required. Producers or broadcasters of audiovisual content, such as movie-companies, television broadcasters or advertisers, are often interested in having knowledge as to whether, where and when their work is distributed. Also the duration of the broadcasts might be of interest. It will be clear that a system according to the invention can also be applied for "broadcast monitoring".

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A method of extracting a watermark which is embedded in an information signal, the information signal representing media content, the method comprising:
    extracting a fingerprint from the information signal, the fingerprint identifying the media content represented by the information signal;
    retrieving a previously stored supporting signal pertaining to the information signal based on the fingerprint, the supporting signal being at least a part of an original signal on which the information signal is based, and the supporting signal being mapped to a fingerprint of the original signal; and
    detecting the watermark embedded in the information signal based on a difference between the information signal and the supporting signal.

2. The method of claim 1, wherein the detecting of the watermark comprises:
    resynchronizing the supporting signal and the information signal;
    subtracting the supporting signal from the information signal; and
    detecting the watermark from the difference signal.

3. The method of claim 1, wherein the watermark comprises an identification of the copyright owner of the media content and an identification of an original buyer of the media content.

4. A method of monitoring distribution of media content in a network based on a watermark, comprising:
    scanning the network for copies of the media content;
    for each copy of the media content, receiving an information signal representing the copy of the media content;
    extracting a fingerprint from the information signal, the fingerprint identifying the media content represented by the information signal;
    retrieving a previously stored supporting signal pertaining to the information signal based on the fingerprint, the supporting signal being at least a part of an original signal on which the information signal is based, and the supporting signal being mapped to a fingerprint of the original signal;
    detecting a watermark embedded in the information signal based on a difference between the information signal and the supporting signal;
    extracting monitoring information from the watermark;
    matching the monitoring information with predetermined information; and
    establishing a copyright violation based on the comparison.

5. The method of claim 4, further comprising establishing a copyright violation if multiple copies of the media content are found having the same information.

6. The method of claim 5, wherein the monitoring information comprises an identification of a content.

7. The method of claim 6, further comprising:
    notifying the original buyer of the media content of the copyright violation based on the extracted original buyer identification.

8. The method of claim 4, further comprising:
    comparing the monitoring information with predetermined information; and
    detecting a copyright violation if a match is found.

9. A monitoring station for monitoring distribution of media content in a network based on a watermark, the monitoring station comprising:
    scanning means configured to scan the network for media content;
    receiving means configured to receive, for each copy of the media content, an information signal representing the media content;
    first extracting means configured to extract a fingerprint from the information signal, the fingerprint identifying the media content represented by the information signal;
    retrieving means configured to retrieve a supporting signal pertaining to the information signal based on the fingerprint, the supporting signal being at least a part of an original signal on which the information signal is based, and the supporting signal being mapped to a fingerprint of the original signal;

first detecting means configured to detect a watermark embedded in the information signal based on the supporting signal;

second extracting means configured to extract first monitoring information from the watermark; and comparing means configured to match the monitoring information with predetermined information, wherein the comparing means is further configured to establish a copyright violation based on the comparison.

10. The monitoring station of claim 9, wherein the comparison means being further configured to establish a copyright violation if multiple copies of the media content are found having the same monitoring information.

11. The monitoring station of claim 10, wherein the monitoring information comprises an identification of the content media copyright owner and an identification of an original buyer of the media content.

12. The monitoring station of claim 11, further comprising:

notifying means configured to notify the original buyer of the media content of the copyright violation.

13. The monitoring station of claim 9, further comprising a comparing unit, configured to compare the monitoring information with predetermined information, and detect a copyright violation if a match is found.

14. A method for distributing media content in a network, the method comprising:

receiving a request for media content from an original buyer;

retrieving an original signal representing the media content;

determining a fingerprint from the original signal corresponding to the media content;

creating a watermark comprising monitoring information;

embedding the watermark into the original signal; and storing a supporting signal that is at least a part of the original signal in a database and wherein the supporting signal is mapped to the fingerprint corresponding to the original signal; and providing an information signal comprising the original signal having the watermark embedded therein to the original buyer.

15. The method of claim 14, wherein the creating of the watermark comprising monitoring information comprises creating a watermark having an identification of the copyright owner of the media content and an identification of the original buyer.

16. A system for media content distribution, comprising:

a website configured to receive a request for media content from an original buyer;

a watermark embedding unit configured to retrieve an original signal representing media content;

a fingerprint unit configured to determine a fingerprint from the original signal corresponding to the media content;

the watermark embedding unit configured to create a watermark comprising monitoring information and embedding the watermark into the original signal; and a database configured to store a supporting signal that is at least a part of the original signal in a database and wherein the supporting signal is mapped to the fingerprint corresponding to the original signal, wherein the watermark embedding unit is further configured to provide an information signal comprising the original signal having the watermark embedded therein to the original buyer.

17. The system of claim 16, wherein the monitoring information comprises an identification of the copyright owner of the media content and an identification of the original buyer.

* * * * *